United States Patent
Goldberg et al.

(10) Patent No.: US 10,800,427 B2
(45) Date of Patent: Oct. 13, 2020

(54) SYSTEMS AND METHODS FOR A VEHICLE CONTROLLER ROBUST TO TIME DELAYS

(71) Applicant: UATC, LLC, San Francisco, CA (US)

(72) Inventors: Joshua David Goldberg, San Francisco, CA (US); Benjamin Florian Corentin Butin, Mountain View, CA (US)

(73) Assignee: UATC, LLC, San Francisco, CA (US)

(*) Notice: Subject to any disclaimer, the term of this patent is extended or adjusted under 35 U.S.C. 154(b) by 276 days.

(21) Appl. No.: 15/810,524

(22) Filed: Nov. 13, 2017

(65) Prior Publication Data

US 2019/0118829 A1 Apr. 25, 2019

Related U.S. Application Data

(60) Provisional application No. 62/574,247, filed on Oct. 19, 2017.

(51) Int. Cl.

| | | |
|---|---|---|
| G01C 22/00 | (2006.01) | |
| G05D 1/00 | (2006.01) | |
| B60W 50/06 | (2006.01) | |
| G05D 1/02 | (2020.01) | |
| B60W 50/00 | (2006.01) | |
| B60W 30/18 | (2012.01) | |
| A01B 69/00 | (2006.01) | |
| B62D 6/00 | (2006.01) | |
| B62D 11/00 | (2006.01) | |
| B62D 12/00 | (2006.01) | |
| B63G 8/20 | (2006.01) | |
| B63H 25/04 | (2006.01) | |
| G06F 7/00 | (2006.01) | |
| G06F 17/00 | (2019.01) | |
| G05D 3/00 | (2006.01) | |

(52) U.S. Cl.
CPC .......... B60W 50/06 (2013.01); B60W 30/18 (2013.01); B60W 50/0097 (2013.01); G05D 1/0212 (2013.01); B60W 2050/0008 (2013.01); G05D 2201/0213 (2013.01)

(58) Field of Classification Search
CPC .. B60W 50/06; B60W 30/18; B60W 50/0097; G05D 1/0212; B62D 6/001; B62D 6/003; B62D 15/029; B62D 5/046
USPC ................................................ 701/23, 41, 2
See application file for complete search history.

(56) References Cited

U.S. PATENT DOCUMENTS

| | | | | |
|---|---|---|---|---|
| 2011/0010022 | A1* | 1/2011 | Beavin | G05D 1/0044 701/2 |
| 2014/0012469 | A1* | 1/2014 | Kunihiro | B60W 40/072 701/41 |
| 2018/0001926 | A1* | 1/2018 | Swieter | B62D 1/286 |

* cited by examiner

*Primary Examiner* — Mahmoud S Ismail
(74) *Attorney, Agent, or Firm* — Dority & Manning, P.A.

(57) ABSTRACT

Systems and methods are directed to compensating for time delays. In one example, a system includes one or more processors and memory including instructions that, when executed by the one or more processors, cause the one or more processors to perform operations. The operations include obtaining first pose data indicative of a pose of a vehicle; obtaining first control data indicative of a first vehicle control command that has yet to affect control of the vehicle; determining, based at least partially on the first pose data and the first control data, predicted pose data indicative of an estimate of a pose of the vehicle that will result after the vehicle control command affects control of the vehicle; and generating, based at least partially on the predicted pose data, second control data indicative of a second vehicle control command to be applied subsequent to the first vehicle control command.

20 Claims, 7 Drawing Sheets

SYSTEMS AND METHODS FOR A VEHICLE CONTROLLER ROBUST TO TIME DELAYS

This application claims the benefit of U.S. Provisional Application No. 62/574,247, filed Oct. 19, 2017, which is incorporated herein by reference.

FIELD

The present disclosure relates generally to autonomous vehicles.

BACKGROUND

An autonomous vehicle is a vehicle that is capable of sensing its environment and navigating with little to no human input. In some cases, an autonomous vehicle can be operated in a fully autonomous mode without human driver intervention or a partially autonomous mode with human driver intervention. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a system. The system includes one or more processors and one or more memories including instructions that, when executed by the one or more processors, cause the one or more processors to perform operations. The operations include obtaining first pose data indicative of a pose of a vehicle. The operations further include obtaining first control data indicative of a first vehicle control command that has yet to affect control of the vehicle. The operations further include determining, based at least partially on the first pose data and the first control data, predicted pose data indicative of an estimate of a pose of the vehicle that will result after the vehicle control command affects control of the vehicle. The operations further include generating, based at least partially on the predicted pose data, second control data indicative of a second vehicle control command to be applied subsequent to the first vehicle control command.

Another example aspect of the present disclosure is directed to a computer-implemented method for providing delay compensation for a vehicle controller. The method includes obtaining, by a computing system comprising one or more computing devices, first pose data indicative of a pose of a vehicle. The method further includes obtaining, by the computing system, first control data indicative of a first vehicle control command that has yet to affect control of the vehicle. The method further includes determining, by the computing system based at least partially on the first pose data and the first control data, predicted pose data indicative of an estimate of a pose of the vehicle that will result after the vehicle control command affects control of the vehicle. The method further includes generating, by the computing system based at least partially on the predicted pose data, second control data indicative of a second vehicle control command to be applied subsequent to the first vehicle control command.

Another example aspect of the present disclosure is directed to an autonomous vehicle. The autonomous vehicle includes a vehicle computing system. The vehicle computing system includes one or more processors and memory including instructions that, when executed by the one or more processors, cause the one or more processors to perform operations. The operations include obtaining first pose data indicative of a pose of the autonomous vehicle. The operations further include obtaining first control data indicative of a first vehicle control command that has yet to affect control of the vehicle. The operations further include determining, based at least partially on the first pose data and the first control data, predicted pose data indicative of an estimate of a pose of the vehicle that will result after the vehicle control command affects control of the vehicle. The operations further include generating, based at least partially on the predicted pose data, second control data indicative of a second vehicle control command to be applied subsequent to the first vehicle control command.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
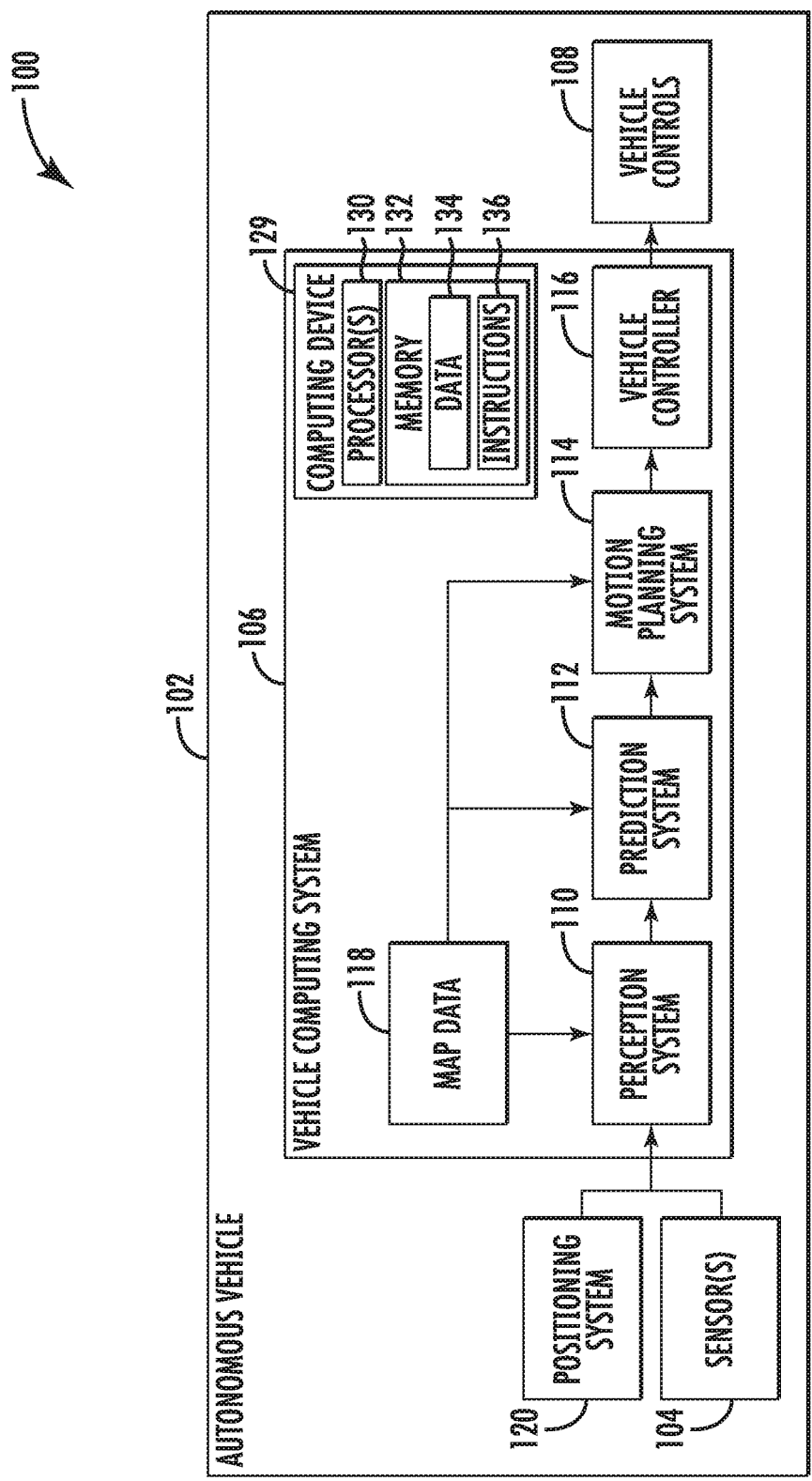
FIG. 1 depicts a block diagram of an example system for controlling the navigation of a vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to compensating for time delays for a vehicle controller during operation of a vehicle, either partially or fully autonomous. In particular, the systems and methods of the present disclosure can determine commands output from the vehicle controller that have yet to be executed and affect the vehicle (e.g., affect a vehicle actuator). The systems and methods of the present disclosure can predict what the vehicle pose (e.g., vehicle location and orientation/heading) will be at some amount of time in the future that aligns with when a new command would be expected to affect a vehicle control. The systems and methods of the present disclosure can input this predicted position to the vehicle controller for calculation of heading error, track error, and/or the like and a determination of a next command for a vehicle control, thereby compensating for time delays.

For instance, a vehicle controller can generate commands to provide for autonomous operation of a vehicle. For example, a vehicle controller can receive a plan trajectory and current vehicle position as input and determine what commands should be output to control the vehicle. In an autonomous vehicle, there can be a significant delay between the output of a command by a vehicle controller and the actual execution of the command by the vehicle (e.g., by a vehicle actuator, etc.). It can be desirable to compensate or account for the delay to ensure the control command will provide the correct action at the time the control command is applied. For example, if the vehicle controller is making a decision on a command to be output based on current information now (e.g., the vehicle location/orientation now, at time($0$)), but the command will not be executed by the vehicle until sometime in the future because of the delay, then the command can be old or stale. Thus, due to the delay before execution, the command may no longer be as optimum a command when it is executed, for example, in terms of the vehicle position and trajectory.

Example aspects of the present disclosure can provide for a delay compensator that can modify input to a vehicle controller to compensate for the time delays between the vehicle controller and execution of a command by a vehicle control (e.g., actuator, etc.). In particular, a delay compensator can predict where the vehicle may be (e.g., vehicle pose) at some amount of time into the future that aligns with when a command is expected to be executed to affect a vehicle actuator and create a change in the vehicle. For example, in some implementations, the delay compensator can store a history of previous commands sent by the vehicle controller that have yet to affect the vehicle. The delay compensator can integrate the commands and use them in determining a prediction of the position of the vehicle at a determined amount of time into the future. The delay compensator can provide this predicted vehicle pose (e.g., vehicle location/orientation) to the vehicle controller to use in determining what command should be output by the vehicle controller to control the autonomous vehicle.

For example, an autonomous vehicle (e.g., a ground-based vehicle, air-based vehicle, other vehicle type, etc.) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., LIDAR data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and include various subsystems that can cooperate to perceive the surrounding environment of the autonomous vehicle and determine a motion plan for controlling the motion of the autonomous vehicle. For instance, the vehicle computing system can include a perception system, a prediction system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller.

The vehicle controller can generate one or more commands, based at least in part on the motion plan, which can be provided to one or more vehicle control interfaces. The one or more commands from the vehicle controller can provide for operating one or more vehicle controls (e.g., actuators or other devices that control acceleration, throttle, steering, braking, etc.) to execute the selected motion plan.

For example, a vehicle controller can receive as input plan data (e.g., a trajectory the autonomous vehicle is supposed to follow) and vehicle current pose data, which are in the same coordinate frame. The vehicle controller can compare the current position and the position of the trajectory it is supposed to follow and make a series of calculations based, for example, on curvature of trajectory, cross track error between trajectory and current position of the vehicle, desired heading in trajectory compared to the current heading of the vehicle, slip angle of the tires, and/or the like. Based on a certain number of weights and errors in these values, the vehicle controller can determine what the output command should be for the lateral control (e.g., what the steering angle should be) and/or the longitudinal control (e.g., acceleration, braking).

However, in an autonomous vehicle, there can be in some cases a non-trivial delay between the output of a command by a vehicle controller and the actual execution of the command by the vehicle (e.g., by a vehicle actuator, etc.). For example, for lateral control (e.g., steering) the delay can be up to around 200 milliseconds. For longitudinal control (e.g., throttle, brake) the delay can be up to around 300 milliseconds. It can be desirable to compensate for the delays to ensure stability in the control of the autonomous vehicle, particularly at higher speeds. Otherwise, decisions made regarding how to control the autonomous vehicle, if the delays are not accounted for, may be out of date, or stale, at the time the command is actually executed by the vehicle. As such, because of the delay before execution of the command by the vehicle, the command may no longer be the best command at the point in time that it is executed, for example, in terms of the vehicle position and trajectory.

Example systems and methods of the present disclosure can provide for a delay compensator that can compensate for delays between the vehicle controller and the actual execution of a command from the vehicle controller by the vehicle (e.g., by an actuator, etc.).

According to example aspects of the present disclosure, in some implementations, the delay compensator can assume a fixed delay (e.g., based on the lateral control delay, etc.) and for each cycle, the vehicle controller can determine a predicted vehicle pose by predicting the current vehicle pose forward to the point in the future when the command generated in that cycle would be expected to affect the vehicle.

In some implementations, the vehicle controller can generate the prediction by maintaining a buffer of previous control commands that have not taken effect and their time of execution (e.g., command timestamp plus delay). The vehicle controller can iterate through these stored commands while integrating a motion model of the autonomous vehicle, with the assumption that each one of these stored commands affects the pose of the vehicle for the period of time before the next command was received by the vehicle controls. Specifically, the motion model of the autonomous vehicle can use the steering angle and acceleration in these command messages to calculate updates to heading, velocity, and position. This can effectively extrapolate the autonomous vehicle's pose forward in time from the latest pose. The input pose data can have delay itself, so this iteration can start from the acquisition time of the pose data and continues into the future until the execution time of the command. The resulting pose of this prediction and delay compensation can be provided as input to the vehicle controller to calculate heading error, cross track error, etc. for use in determining an appropriate command to control operation of the vehicle. As far as the vehicle controller is concerned, the vehicle pose is understood to be this predicted pose in the future assuming the previous commands were executed by the vehicle controls.

According to an aspect of the present disclosure, in some implementations, delay compensation is performed at the input stage of the vehicle controller, before the vehicle controller executes to generate a next command for the vehicle. For example, the current vehicle pose data can be first supplied as input to the delay compensator. The delay compensator can query its stored commands (e.g., previous commands stored in an internal history or buffer) and iterate through the previous commands that have yet to affect the vehicle to determine a predicted pose of the vehicle. The vehicle controller can then receive this predicted pose data along with the vehicle plan data for use in determining command data to be provided to the vehicle controls. The command data output by the vehicle controller can also be provided back to the delay compensator, in addition to being provided to the vehicle controls, to update the delay compensators command history to provide for delay compensation for future vehicle controller commands.

In some implementations, the delay compensation can be performed for both the lateral control (e.g., steering) and the longitudinal control (e.g., acceleration, braking), as both the lateral control and the longitudinal control can be affected by time delays. For example, in some implementations, the delay for the lateral control system (e.g., steering system) can be determined and the lateral control delay can be used in providing delay compensation for both the lateral control and the longitudinal control. For example, the predicted pose data provided to the vehicle controller can be based in part on the lateral control delay, which may be smaller than the longitudinal control delay. The vehicle controller can determine commands for both the lateral control and the longitudinal control based in part on this predicted pose data from the delay compensator.

According to another aspect of the present disclosure, in some implementations, the delay compensator can provide compensation for both lateral control delay and longitudinal control delay. For example, in some implementations, the lateral control delay can be up to around 200 milliseconds and the longitudinal control delay can be up to around 300 milliseconds. In some implementations, the delay compensator can generate first predicted pose data based in part on the lateral control delay and provide the first predicted pose data to the vehicle controller for determination of lateral control commands. The delay compensator can further generate second predicted pose data based in part on the longitudinal control delay and provide the second predicted pose data to the vehicle controller for determination of longitudinal control commands.

According to another aspect of the present disclosure, in some implementations, a delay estimator can also be provided. For example, in some implementations, the delay (e.g., lateral control delay, etc.) can be treated as a fixed value in the delay compensation. However, the actual delay value can actually oscillate based on a variety of factors, such as delays in the transmission of data in the vehicle, delays in how that data is handled, delays in the reaction of the actuators (e.g., delay in the reaction of the steering motor in the steering column), and/or the like. As such, in some implementations, a delay estimator can be provided that can estimate the delay for a control system such as, for example, the lateral control. In some implementations, for example, the feedback of the position of the steering column, feedback of the torque on the steering column, and/or the like, can be determined and can be compared to the actual commands for the lateral control system. A time delta between the two signals (e.g., feedback versus commands) can be determined and used to provide delay estimation. The delay estimation can then be provided to the delay compensator to use in determining the predicted pose data to compensate for the delay.

According to another aspect of the present disclosure, in some implementations, an error integrator can provide for compensating for steady state errors in vehicle control. For example, in some implementations, errors can be tracked or aggregated over time to provide an integration of the error to compensate for steady state errors (e.g., fixed or constant error). For example, due to various factors, when a vehicle is commanded to drive straight, it may actually pull slightly left or pull slightly right. As such, in some implementations, the error integration can compensate by estimating and correcting for those constant offsets. As another example, a vehicle may traveling be under a crosswind during a period of time, such as when driving through an open area with a steady crosswind, which can require turning the steering wheel a bit to the side to adjust for it. In such situations, the error integrator can track and compensate for the steering error created by the crosswind.

The systems and methods described herein provide a number of technical effects and benefits. For instance, the vehicle computing system can locally (e.g., on board the autonomous vehicle) compensate for delay in execution of vehicle controller commands by vehicle control systems in an autonomous vehicle and provide for more appropriate responses during operation of the autonomous vehicle. For example, by providing a vehicle controller that is more robust to time delay, the systems and methods of the present disclosure can provide for more accurate vehicle control commands and more effectively maintain a desired vehicle trajectory. As such, the vehicle computing system can proactively adjust the operation of the autonomous vehicle to achieve improved driving safety.

The systems and methods described herein can also provide resulting improvements to vehicle computing technology tasked with operation of an autonomous vehicle. For example, aspects of the present disclosure can enable a vehicle computing system to more efficiently and accurately control an autonomous vehicle's motion by achieving improvements in a vehicle controller by compensating for delay in the generation and execution of vehicle control commands.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well. Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116. The vehicle controller 116 can generate one or more commands, based at least in part on the motion plan, which can be provided to one or more vehicle interfaces. The one or more commands from the vehicle controller 116 can provide for operating one or more vehicle controls 108 (e.g., actuators or other devices that control acceleration, throttle, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
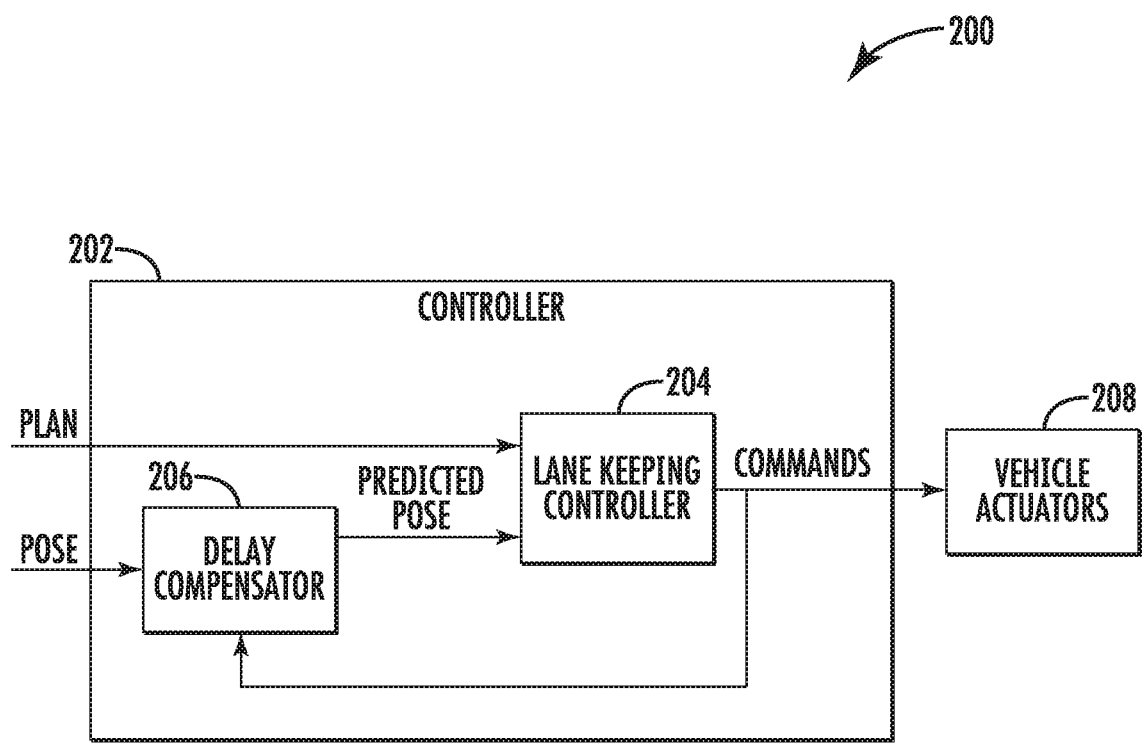
FIG. 2 depicts a block diagram of an example system to provide for delay compensation to a vehicle controller according to example embodiments of the present disclosure.

FIG. 2 depicts a block diagram of an example system 200 to provide for delay compensation to a vehicle controller according to example embodiments of the present disclosure. As illustrated in FIG. 2, system 200 can include a controller 202 and one or more vehicle actuators 208. The controller 202 can include a lane keeping controller 204 and a delay compensator 206. The delay compensator 206 can modify one or more inputs to a vehicle controller, such as lane keeping controller 204, to compensate for the time delays between the vehicle controller and execution of a command by a vehicle control, such as actuator(s) 208.

The controller 202 can obtain vehicle plan data and vehicle pose data, for example, from one or more autonomy subsystems in a vehicle computing system, such as described in regard to FIG. 1. The controller 202 can provide the vehicle pose data to the delay compensator 206 and provide the vehicle plan data to the lane keeping controller 204. The delay compensator 206 can generate a predicted vehicle pose, based in part on the received pose data, to compensate for the time delays between a vehicle controller (e.g., lane keeping controller 204) and execution of a command by a vehicle actuator 208.

For example, the delay compensator 206 can predict where the vehicle may be (e.g., predicted vehicle pose) at some amount of time into the future that aligns with when a command is expected to be executed to affect a vehicle actuator and create a change in the vehicle. In some implementations, the delay compensator 206 can assume a fixed delay (e.g., based on a lateral control delay, etc.) and for each cycle, the delay compensator 206 can determine a predicted vehicle pose by predicting the current vehicle pose forward to the point in the future when the command generated in that cycle would be expected to affect the vehicle.

In some implementations, the delay compensator 206 can generate the predicted vehicle pose by maintaining a buffer of previous control commands that have not taken effect and their time of execution (e.g., command timestamp plus delay). The delay compensator 206 can iterate through these stored commands while integrating a motion model of the autonomous vehicle, with the assumption that each one of these stored commands affects the pose of the vehicle for the period of time before the next command would be received by the vehicle controls. Specifically, the motion model of the autonomous vehicle can use the steering angle and acceleration in these command messages to calculate updates to heading, velocity, and position. This can effectively extrapolate the autonomous vehicle's position forward in time from the latest vehicle pose data. The input pose data can have delay itself, so this iteration can start from the acquisition time of the pose data and continue into the future until the execution time of the command.

The predicted pose data can then be provided as input to the vehicle controller, such as lane keeping controller 204, to calculate heading error, cross track error, etc. The lane keeping controller can use this data along with the vehicle plan data in determining an appropriate next command to control operation of the vehicle.

The lane keeping controller 204 can then provide this next vehicle command to the vehicle actuator(s) 208. The next vehicle command can also be provided back to the delay compensator 206 to be stored to the buffer of previous control commands that have yet not taken effect, and which can then be used in providing delay compensation for future vehicle commands.

Figure 3:
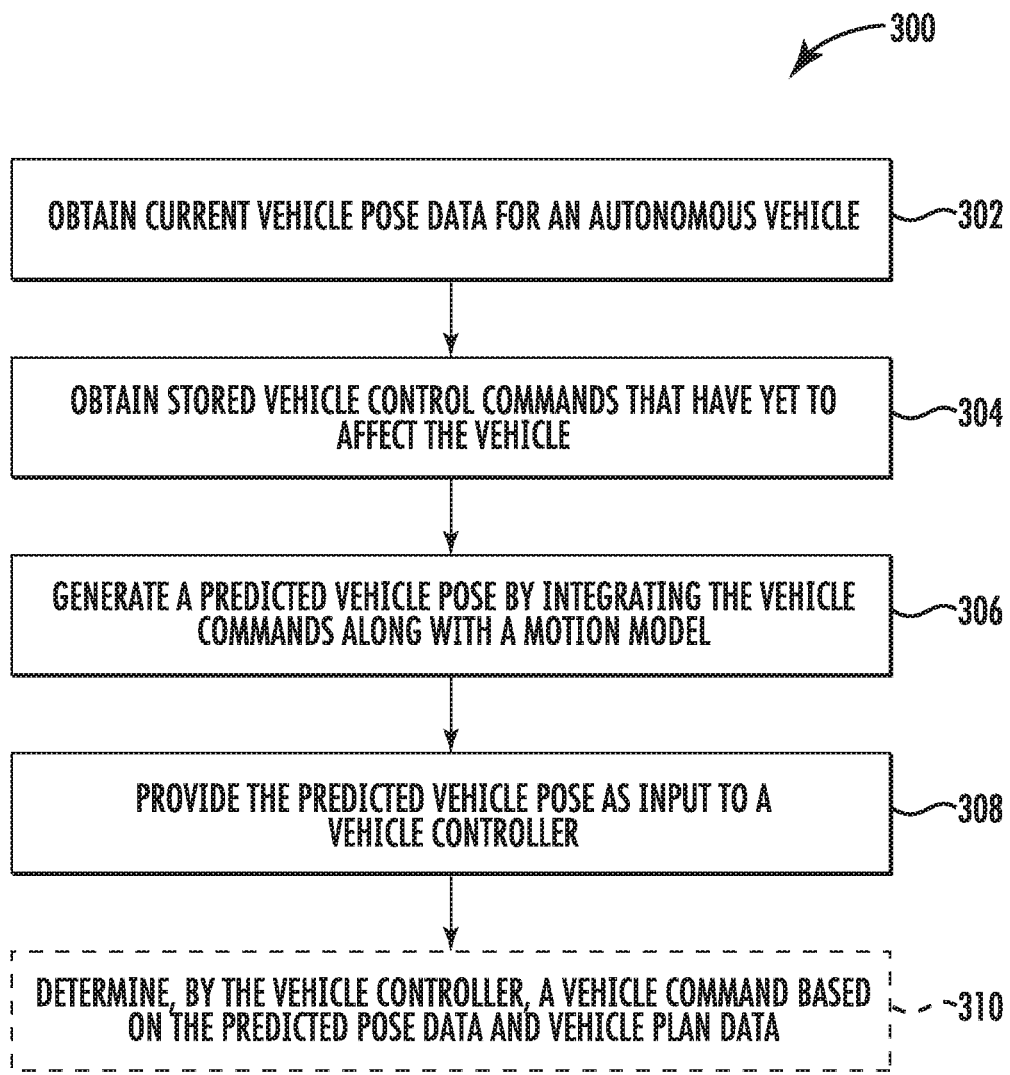
FIG. 3 depicts a flowchart diagram of an example method for providing delay compensation to a vehicle controller according to example embodiments of the present disclosure.

FIG. 3 depicts a flowchart diagram of example operations 300 for providing delay compensation to a vehicle controller according to example embodiments of the present disclosure. One or more portion(s) of the operations 300 can be implemented by one or more computing devices such as, for example, the vehicle computing system 106 of FIG. 1, the computing system 602 or 106 of FIG. 6, and/or the like. Moreover, one or more portion(s) of the operations 300 can be implemented as an algorithm on the hardware components of the device(s) described herein (e.g., as in FIGS. 1 and 6) to, for example, provide delay compensation for a vehicle controller during autonomous vehicle operation.

At 302, one or more computing devices included within a computing system (e.g., computing system 106, 602, or the like) can obtain current vehicle pose data (e.g., vehicle location and orientation/heading) for an autonomous vehicle. For example, the computing system (e.g., delay compensator) can obtain current vehicle pose data from one or more autonomy subsystems included in a vehicle computing system.

At 304, the computing system can obtain one or more stored vehicle commands that have been provided to a vehicle control (e.g., actuator, etc.) but that have yet not taken effect. For example, a buffer of previous vehicle commands that have not taken effect and their time of execution (e.g., command timestamp plus delay) can be maintained by the computing system.

At 306, the computing system can generate predicted vehicle pose data by iterating through the one or more stored vehicle commands while integrating a motion model of the autonomous vehicle. The predicted vehicle pose data can effectively extrapolate the autonomous vehicle's position forward in time from the latest vehicle pose data, and thereby compensate for delay between a vehicle controller and execution of a command by a vehicle control. At 308, the computing system can provide the predicted vehicle pose data as input to a vehicle controller.

Additionally, at 310, the computing system can determine an appropriate next vehicle command to be provided to a vehicle control based, at least in part, on the predicted pose data and obtained vehicle plan data. The computing system can then provide such next vehicle command to a vehicle control to be executed. The computing system can also provide such next vehicle command to be stored to the buffer maintaining the previous vehicle commands that have not taken effect.

Figure 4:
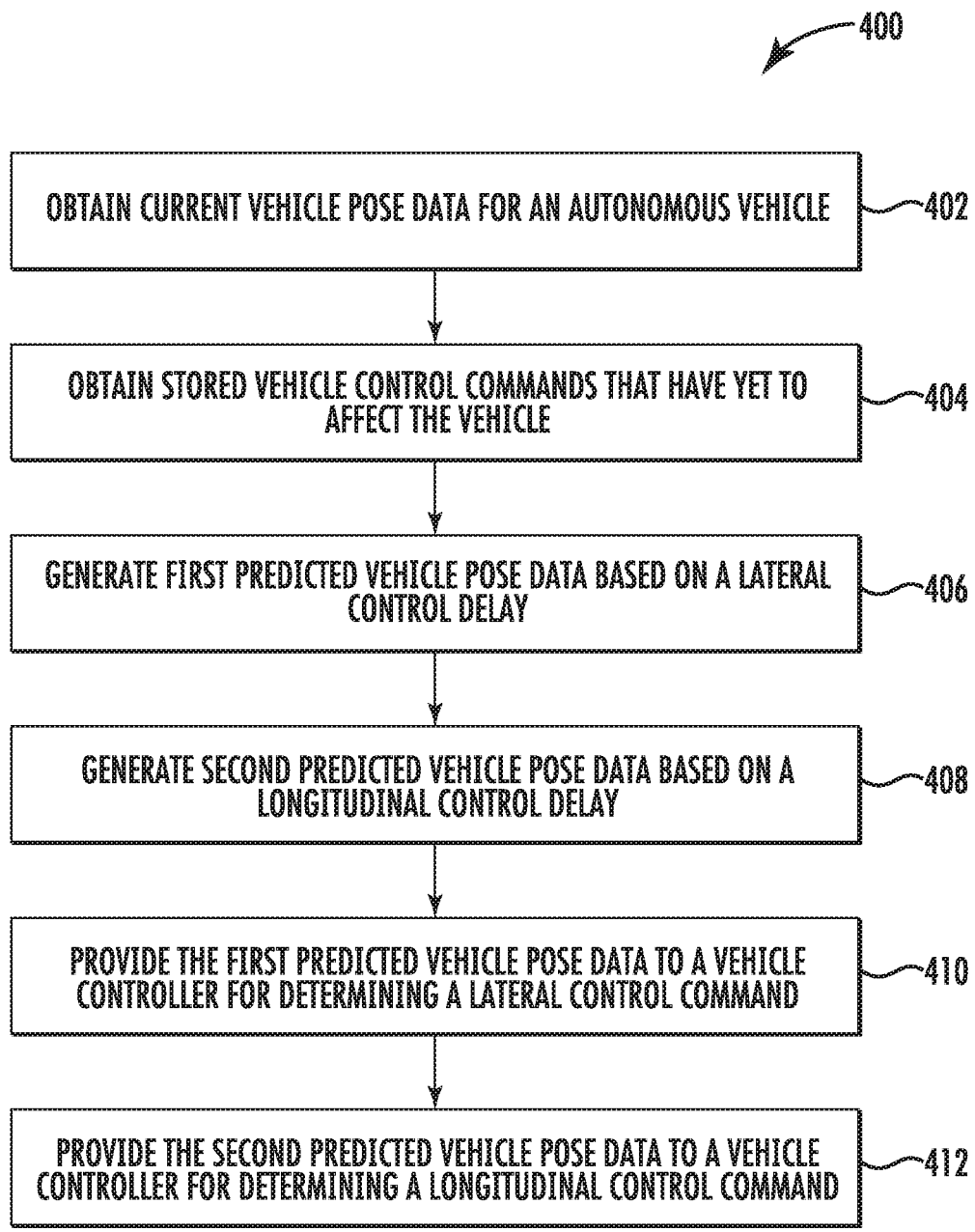
FIG. 4 depicts a flowchart diagram of an example method for providing delay compensation to a vehicle controller according to example embodiments of the present disclosure.

FIG. 4 depicts a flowchart diagram of example operations 400 for providing delay compensation to a vehicle controller according to example embodiments of the present disclosure. One or more portion(s) of the operations 400 can be implemented by one or more computing devices such as, for example, the vehicle computing system 106 of FIG. 1, the computing system 602 or 106 of FIG. 6, and/or the like. Moreover, one or more portion(s) of the operations 400 can be implemented as an algorithm on the hardware components of the device(s) described herein (e.g., as in FIGS. 1 and 6) to, for example, provide delay compensation for a vehicle controller during autonomous vehicle operation.

At 402, one or more computing devices included within a computing system (e.g., computing system 106, 602, or the like) can obtain current vehicle pose data (e.g., vehicle location and orientation/heading) for an autonomous vehicle. For example, the computing system can obtain current vehicle pose data from one or more autonomy subsystems included in a vehicle computing system.

At 404, the computing system can obtain one or more stored vehicle commands that have been provided to a vehicle control (e.g., actuator, etc.) but that have yet not taken effect.

At 406, the computing system can generate first predicted vehicle pose data based on a lateral control delay by iterating through the one or more stored vehicle commands using their time of execution (e.g., command timestamp plus lateral control delay) while integrating a motion model of the autonomous vehicle.

At 408, the computing system can generate second predicted vehicle pose data based on a longitudinal control delay by iterating through the one or more stored vehicle commands using their time of execution (e.g., command timestamp plus longitudinal control delay) while integrating a motion model of the autonomous vehicle.

At 410, the computing system can provide the first predicted vehicle pose data as input to a vehicle controller. The vehicle controller can use the first predicted vehicle pose data in determining an appropriate next lateral control command to be provided to a vehicle control.

At 412, the computing system can provide the second predicted vehicle pose data as input to a vehicle controller. The vehicle controller can use the second predicted vehicle pose data in determining an appropriate next longitudinal control command to be provided to a vehicle control.

Figure 5:
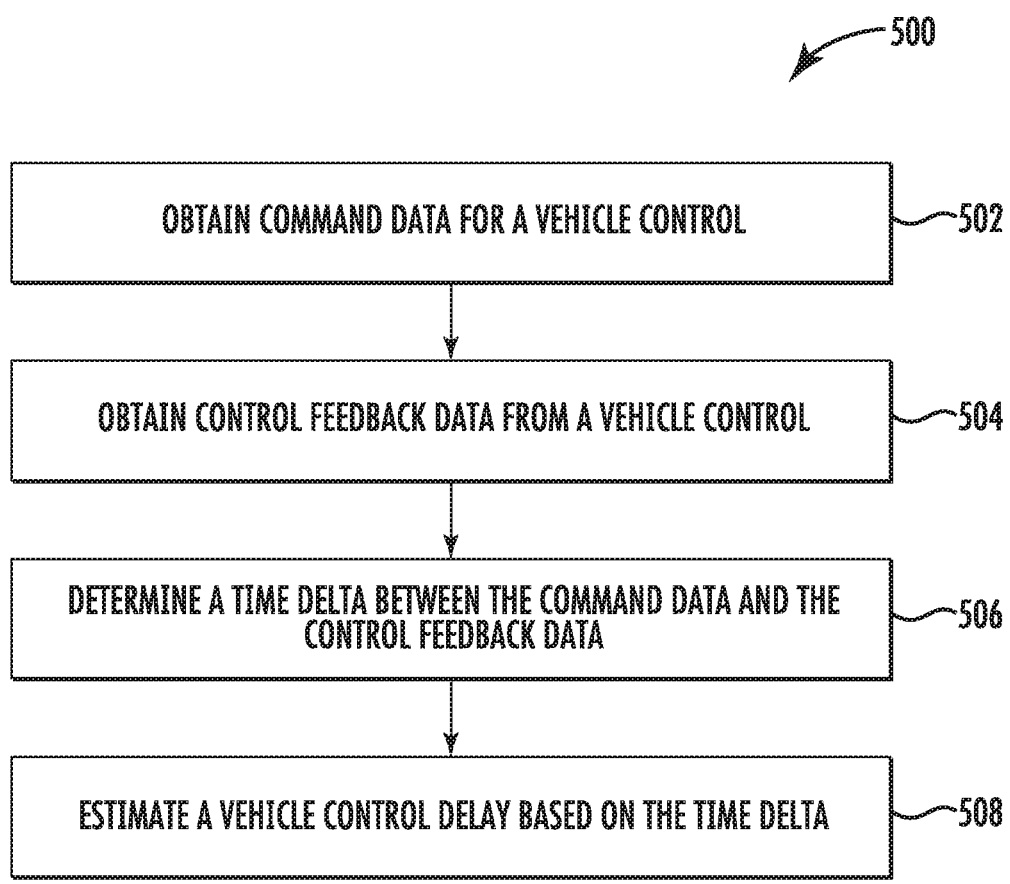
FIG. 5 depicts a flowchart diagram of an example method for providing delay estimation according to example embodiments of the present disclosure.

FIG. 5 depicts a flowchart diagram of example operations 500 for providing delay estimation according to example embodiments of the present disclosure. One or more portion(s) of the operations 500 can be implemented by one or more computing devices such as, for example, the vehicle computing system 106 of FIG. 1, the computing system 602 or 106 of FIG. 6, and/or the like. Moreover, one or more portion(s) of the operations 500 can be implemented as an algorithm on the hardware components of the device(s) described herein (e.g., as in FIGS. 1 and 6) to, for example, provide for delay estimation to be used by a delay compensator.

At 502, one or more computing devices included within a computing system (e.g., computing system 106, 602, or the like) can obtain command data for a vehicle control, for example, from a vehicle controller.

At 504, the computing system can obtain vehicle control feedback data from a vehicle control. For example, the computing system can obtain vehicle control feedback such as feedback of the position of the steering column, feedback of the torque on the steering column, and/or the like.

At 506, the computing system can determine a time delta between the obtained vehicle control command data and the vehicle control feedback data.

At 508, the computing system can estimate a vehicle control delay based on the time delta. The computing system can provide this delay estimation, for example to a delay compensator, for use in determining predicted pose data for delay compensation.

Although FIGS. 3, 4, and 5 depict steps performed in a particular order for purposes of illustration and discussion, the methods of the present disclosure are not limited to the particularly illustrated order or arrangement. The various steps of the methods 300, 400, and 500 can be omitted, rearranged, combined, and/or adapted in various ways without deviating from the scope of the present disclosure.

Figure 6:
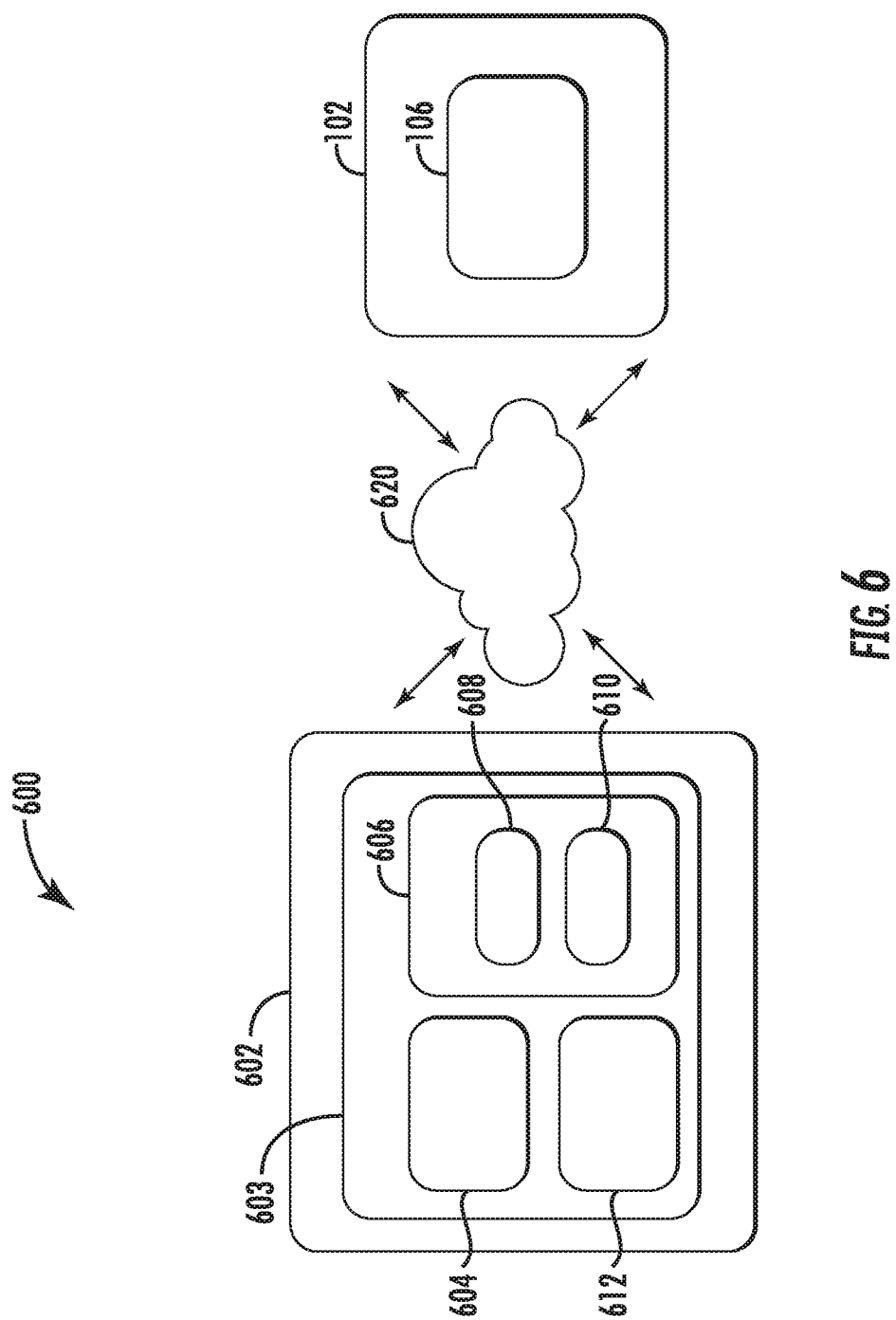
FIG. 6 depicts a block diagram of an example computing system according to example embodiments of the present disclosure.

FIG. 6 depicts a block diagram of an example computing system 600 according to example embodiments of the present disclosure. The example computing system 600 illustrated in FIG. 6 is provided as an example only. The components, systems, connections, and/or other aspects illustrated in FIG. 6 are optional and are provided as examples of what is possible, but not required, to implement the present disclosure. In some implementations, the example computing system 600 can include the vehicle computing system 106 of the autonomous vehicle 102 and a computing system 602 (e.g., an operations computing system), including one or more computing device(s) 603, that is remote from the autonomous vehicle 102. The vehicle computing system 106 of the autonomous vehicle 102 and the computing system 602 can be communicatively coupled to one another over one or more networks 620. The computing system 602 can, for example, be associated with a central operations system and/or an entity associated with the autonomous vehicle 102 such as, for example, a vehicle owner, vehicle manager, fleet operator, service provider, etc.

The computing device(s) 603 of the computing system 602 can include processor(s) 604 and a least one memory 606. The one or more processors 604 can be any suitable processing device (e.g., a processor core, a microprocessor, an ASIC, a FPGA, a controller, a microcontroller, etc.) and can be one processor or a plurality of processors that are operatively connected. The memory 606 can include one or more non-transitory computer-readable storage media, such as RAM, ROM, EEPROM, EPROM, one or more memory devices, flash memory devices, etc., and combinations thereof.

The memory 606 can store information that can be accessed by the one or more processors 604. For instance, the memory 606 (e.g., one or more non-transitory computer-readable storage mediums, memory devices) can include computer-readable instructions 608 can be executed by the one or more processors 604. The instructions 608 can be software written in any suitable programming language or can be implemented in hardware. Additionally, or alternatively, the instructions 608 can be executed in logically and/or virtually separate threads on processor(s) 604.

For example, the memory 606 can store instructions 608 that when executed by the one or more processors 604 cause the one or more processors 604 to perform operations such as any of the operations and functions of the computing device(s) 603 or for which the computing device(s) 603 are configured, as described herein including, for example, operations of FIGS. 3, 4, and/or 5.

The memory 606 can store data 610 that can be obtained, received, accessed, written, manipulated, created, and/or stored. The data 610 can include, for instance, sensor data, map data, service request data (e.g., trip and/or user data), operational data, etc., as described herein. In some implementations, the computing device(s) 603 can obtain data from one or more memory device(s) that are remote from the computing system 602.

The computing device(s) 603 can also include one or more communication interfaces 612 used to communicate with one or more other system(s) associated with the computing system 602 and/or another computing device that is remote from the computing system 602, such as the vehicle computing system 106 of the autonomous vehicle 102, for example. The communication interface 612 can include any circuits, components, software, etc. for communicating with one or more networks (e.g., 620). In some implementations, the communication interface 612 can include for example, one or more of a communications controller, receiver, transceiver, transmitter, port, conductors, software, and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 620 can be accomplished, for instance, via a communication interface using any type of protocol, protection scheme, encoding, format, packaging, etc.

The vehicle computing system 106 of the autonomous vehicle can include one or more computing devices, such as described in regard to FIG. 1. The remote computing devices can include components (e.g., processor(s), memory, instructions, data, etc.) similar to that described herein for the computing device(s) 603, and as described in regard to FIG. 1. Moreover, the vehicle computing system 106 can be configured to perform one or more operations, as described herein including, for example, operations of FIGS. 3, 4, and/or 5.

Figure 7:
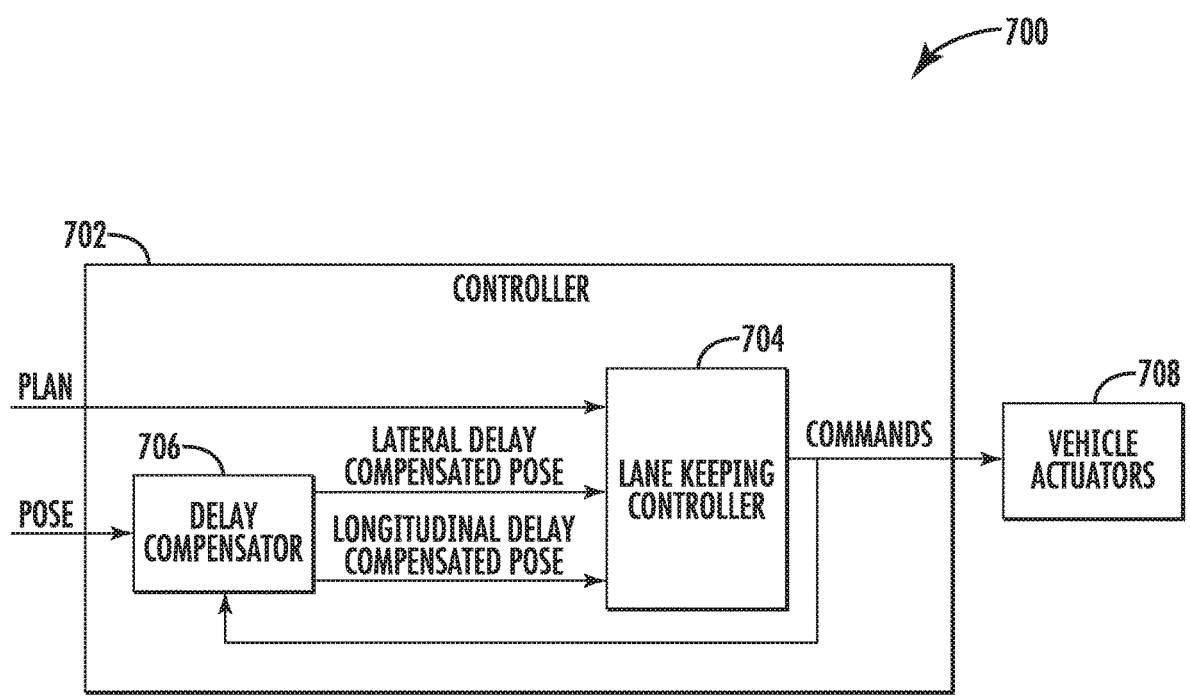
FIG. 7 depicts a block diagram of an example system to provide for delay compensation to a vehicle controller according to example embodiments of the present disclosure.

FIG. 7 depicts a block diagram of an example system 700 to provide for delay compensation for a vehicle controller according to example embodiments of the present disclosure. As illustrated in FIG. 7, system 700 can include a controller 702 and one or more vehicle actuators 708. The controller 702 can include a lane keeping controller 704 and a delay compensator 706. The delay compensator 706 can modify one or more inputs to a vehicle controller, such as lane keeping controller 704, to compensate for the time delays between the vehicle controller and execution of a command by a vehicle control, such as vehicle actuator(s) 708. In some implementations, the delay compensator 706 can provide compensation for both lateral control delay and longitudinal control delay.

The controller 702 can obtain vehicle plan data and vehicle pose data, for example, from one or more autonomy subsystems in a vehicle computing system, such as described in regard to FIG. 1. The controller 702 can provide the vehicle pose data to the delay compensator 706 and provide the vehicle plan data to the lane keeping controller 704.

The delay compensator 706 can generate first predicted pose data based in part on a lateral control delay and the received pose data, to compensate for the time delays between the lane keeping controller 704 and execution of a lateral vehicle control command by a vehicle control, such as a vehicle actuator 708. The delay compensator 706 can generate second predicted pose data based in part on a longitudinal control delay and the received pose data, to compensate for the time delays between the lane keeping controller 704 and execution of a longitudinal vehicle control command by a vehicle control, such as a vehicle actuator 708.

The first predicted pose data and the second predicted pose data can then be provided as inputs to the lane keeping controller 704. The first predicted pose data, along with the vehicle plan data, can be used by the lane keeping controller 704 to determine an appropriate next lateral control command for operation of the autonomous vehicle. The second predicted pose data, along with the vehicle plan data, can be used by the lane keeping controller 704 to determine an appropriate next longitudinal control command for operation of the autonomous vehicle.

The lane keeping controller 704 can then provide these next vehicle commands to the vehicle actuator(s) 708. The next vehicle commands can also be provided back to the delay compensator 706 to be stored to the buffer of previous control commands that have yet not taken effect, and which can then be used in providing delay compensation for future vehicle commands.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A system comprising:
one or more processors; and
memory including instructions that, when executed by the one or more processors, cause the one or more processors to perform operations, the operations comprising:
obtaining first pose data indicative of a pose of a vehicle;
obtaining first control data indicative of a first vehicle control command that has yet to affect control of the vehicle;
determining, based at least partially on the first pose data and the first control data, predicted pose data indicative of an estimate of a pose of the vehicle that will result after the first vehicle control command affects control of the vehicle, wherein the predicted pose data is based at least in part on a lateral control delay and a longitudinal control delay; and
generating, based at least partially on the predicted pose data, second control data indicative of a second vehicle control command to be applied subsequent to the first vehicle control command, the second vehicle control command comprising a second lateral control command and a second longitudinal control command.

2. The system of claim 1, wherein the determining of the predicted pose data comprises:
determining updates to one or more of vehicle heading, vehicle velocity, and vehicle position based at least in part on a motion model for an autonomous vehicle and the first control data indicative of the first vehicle control command that has yet to affect control of the vehicle; and
determining the predicted pose data by extrapolating the vehicle pose forward in time based on the updates to one or more of the vehicle heading, the vehicle velocity, and the vehicle position.

3. The system of claim 1, wherein the first control data indicative of the first vehicle control command comprises data indicative of an expected time of execution, wherein the data indicative of the expected time of execution comprises a command time stamp incremented by an expected amount of delay.

4. The system of claim 3, the operations further comprising:
obtaining, from a vehicle controller, the second control data indicative of the second vehicle control command to be applied subsequent to the first vehicle control command; and
storing the second control data indicative of the second vehicle control command with an associated expected time of execution for the command.

5. The system of claim 1, wherein the determining of the predicted pose data and providing the predicted pose data to a vehicle controller comprises:
determining first predicted pose data based at least in part on the vehicle lateral control delay;
determining second predicted pose data based at least in part on the vehicle longitudinal control delay;
providing the first predicted pose data to the vehicle controller to provide for generating the second vehicle lateral control command; and
providing the second predicted pose data to the vehicle controller to provide for generating the second vehicle longitudinal control command.

6. The system of claim 1, the operations further comprising:
determining command data for vehicle control commands being executed;
determining feedback data from a vehicle control system after execution of vehicle control commands;
estimating an amount of delay for execution of a command by the vehicle control system based at least in part on the command data and the feedback data; and
providing the estimated amount of delay for the determination of the predicted pose data.

7. The system of claim 1, wherein the determining of the predicted pose data comprises compensating for steady state errors in one or more of a vehicle controller and a vehicle control system.

8. The system of claim 1, wherein the predicted pose data compensates for one or more delays.

9. A computer-implemented method for providing delay compensation for a vehicle controller comprising:
obtaining, by a computing system comprising one or more computing devices, first pose data indicative of a pose of a vehicle;
obtaining, by the computing system, first control data indicative of a first vehicle control command that has yet to affect control of the vehicle;
determining, by the computing system based at least partially on the first pose data and the first control data, predicted pose data indicative of an estimate of a pose of the vehicle that will result after the first vehicle control command affects control of the vehicle, wherein the predicted pose data is based at least in part on a vehicle lateral control delay and a vehicle longitudinal control delay; and
generating, by the computing system based at least partially on the predicted pose data, second control data indicative of a second vehicle control command to be applied subsequent to the first vehicle control command, the second vehicle control command comprising a second lateral control command and a second longitudinal control command.

10. The computer-implemented method of claim 9, wherein the determining of the predicted pose data further comprises:
determining, by the computing system, updates to one or more of vehicle heading, vehicle velocity, and vehicle position based at least in part on a motion model for an autonomous vehicle and the first control data indicative of the first vehicle control command that has yet to affect control of the vehicle; and
determining, by the computing system, the predicted pose data by extrapolating the vehicle pose forward in time based on the updates to one or more of the vehicle heading, the vehicle velocity, and the vehicle position.

11. The computer-implemented method of claim 9, wherein the first control data indicative of the first vehicle control command comprises data indicative of an expected time of execution, wherein the data indicative of the expected time of execution comprises a command time stamp incremented by an expected amount of delay.

12. The computer-implemented method of claim 11, further comprising:
obtaining, from the vehicle controller, the second control data indicative of the second vehicle control command to be applied subsequent to the first vehicle control command; and
storing, by the computing system, the second control data indicative of the second vehicle control command with an associated expected time of execution for the command.

13. The computer-implemented method of claim 9, wherein the determining of the predicted pose data and providing the predicted pose data to the vehicle controller further comprises:
determining, by the computing system, first predicted pose data based at least in part on the vehicle lateral control delay;
determining, by the computing system, second predicted pose data based at least in part on the vehicle longitudinal control delay;
providing, by the computing system, the first predicted pose data to the vehicle controller to provide for generating the second vehicle lateral control command; and
providing, by the computing system, the second predicted pose data to the vehicle controller to provide for generating the second vehicle longitudinal control command.

14. The computer-implemented method of claim 9, further comprising:
determining, by the computing system, command data for vehicle control commands being executed;
determining, by the computing system, feedback data from a vehicle control system after execution of the vehicle control commands;
estimating, by the computing system, an amount of delay for execution of a command by the vehicle control system based at least in part on the command data and the feedback data; and
providing, by the computing system, the estimated amount of delay for the determination of the predicted pose data.

15. The computer-implemented method of claim 9, wherein the determining of the predicted pose data comprises compensating for steady state errors in one or more of the vehicle controller and a vehicle control system.

16. The computer-implemented method of claim 9, wherein the predicted pose data compensates for one or more delays.

17. An autonomous vehicle comprising:
a vehicle computing system, the vehicle computing system comprising:
one or more processors; and
memory including instructions that, when executed by the one or more processors, cause the one or more processors to perform operations, the operations comprising:
obtaining first pose data indicative of a pose of the autonomous vehicle;
obtaining first control data indicative of a first vehicle control command that has yet to affect control of the vehicle;
determining, based at least partially on the first pose data and the first control data, predicted pose data indicative of an estimate of a pose of the vehicle that will result after the first vehicle control command affects control of the vehicle, wherein the predicted pose data is based at least in part on a lateral control delay and a longitudinal control delay; and
generating, based at least partially on the predicted pose data, second control data indicative of a second vehicle control command to be applied subsequent to the first vehicle control command, the second vehicle control command comprising a second lateral control command and a second longitudinal control command.

18. The autonomous vehicle of claim 17, wherein the determining of the predicted pose data comprises:
determining updates to one or more of vehicle heading, vehicle velocity, and vehicle position based at least in part on a motion model for the autonomous vehicle and the first control data indicative of the first vehicle control command that has yet to affect control of the autonomous vehicle; and
determining the predicted pose data by extrapolating the vehicle pose forward in time based on the updates to one or more of the vehicle heading, the vehicle velocity, and the vehicle position.

19. The autonomous vehicle of claim 17, wherein the first control data indicative of the first vehicle control command comprises data indicative of an expected time of execution, wherein the data indicative of the expected time of execution comprises a command time stamp incremented by an expected amount of delay.

20. The autonomous vehicle of claim 19, the operations further comprising:
obtaining, from a vehicle controller, the second control data indicative of the second vehicle control command to be applied subsequent to the first vehicle control command; and
storing the second control data indicative of the second vehicle control command with an associated expected time of execution for the command.

\* \* \* \* \*